United States Patent [19]

Hicks

[11] Patent Number: 5,594,672
[45] Date of Patent: Jan. 14, 1997

[54] PERIPHERAL POWER SAVER

[75] Inventor: David S. Hicks, Fairfax Station, Va.

[73] Assignee: Micro Energetics Corporation, Farifax Station, Va.

[21] Appl. No.: 247,138

[22] Filed: May 20, 1994

[51] Int. Cl.$^6$ .................. G06F 1/00; H02J 15/00
[52] U.S. Cl. .......... 364/707; 364/492; 364/493; 307/125; 395/725; 395/750
[58] Field of Search .................. 364/707, 234, 364/238.3, 264, 492, 493, 926.93, 928, 948.6; 395/275, 800, 550

[56] References Cited

U.S. PATENT DOCUMENTS

| | | | |
|---|---|---|---|
| 4,647,721 | 3/1987 | Busam et al. | 379/102 |
| 4,675,537 | 6/1987 | Mione | 307/38 |
| 4,731,549 | 3/1988 | Hiddleson | 307/125 |
| 4,747,041 | 5/1988 | Engel et al. | 364/200 |
| 4,794,525 | 12/1988 | Pickert et al. | 364/200 |
| 5,214,785 | 5/1993 | Fairweather | 395/800 |
| 5,321,428 | 6/1994 | Dornier | 347/211 |
| 5,347,167 | 9/1994 | Singh | 307/125 |
| 5,359,540 | 10/1994 | Ortiz | 364/492 |
| 5,477,476 | 12/1995 | Schanin et al. | 364/707 |

OTHER PUBLICATIONS

Advertisement for "Laser Miser. Date of Publication is unknown".
Advertisement for power miser. Date of publication is unknown.
Advertisement for "PC Green Energy Saver" no date of publication (B).
Advertisement for Sequence electronics (tm) Smartbar (tm) Date of publication is unknown. (D).

*Primary Examiner*—Roy N. Envall, Jr.
*Assistant Examiner*—Emmanuel L. Moise
*Attorney, Agent, or Firm*—Gary S. Pisner

[57] ABSTRACT

A device that saves energy by turning on power to a peripheral device such as a printer only when a host computer sends data to its I/O port. When the peripheral device requires a warm-up period, the device will mediate the transition of the peripheral between a power-off state and a ready state by using a hold-off timer function.

2 Claims, 14 Drawing Sheets

Microfiche Appendix Included
(1 Microfiche, 65 Pages)

PERIPHERAL POWER SAVER

Notice

A microfiche appendix (1 fiche, 65 frames) containing computer code is included in this application.

BACKGROUND—FIELD OF INVENTION

This invention relates apparatus for turning on and off a computer printer or other device in response to the state of a computer port and the process for controlling said apparatus to minimize power utilization by the controlled device.

BACKGROUND—DESCRIPTION OF RELATED ART

In a time when energy consumption is increasing throughout the world, the efficient use of energy becomes more critical. One can build new power plants, extract more fossil fuels, build more nuclear reactors, or as with this invention, create a methodology for minimizing energy usage by energy consuming devices.

The present invention is a device that can reduce energy consumption of various computer peripheral devices including computer printers. This ability is particularly important for energy conservation because a laser printer typically consumes 100 w of power.

There are a few computer energy saving devices that reduce power consumption. Most of these devices, unlike the present invention, are integrated into the computer equipment and cannot be retrofitted on existing equipment. Generally these devices achieve their energy savings by placing the computer equipment into a low energy "sleep" state.

One of the few devices that can be added to an existing computer is Fairweather U.S. Pat. No. 5,214,785 issued May 1993. The Fairwether device monitors a computer keyboard for activity. If keyboard activity is present, power will be supplied to a computer device (typically a video monitor). Thus, the approach taken by Fairwether is dissimilar to the present invention, which regulates power to a peripheral based on the activity of a serial, parallel or other data port. Furthermore, orientation towards power switches that are triggered by keyboard activity is very limiting. For example, if a computer is required to print out data at regular intervals, or print out faxes when received, obviously, if no one is typing on a computer keyboard the printer must be turned on at all times. Finally, the related art lacks the ability to power-up peripherals that require a warm-up period, without loss of data, or without a peripheral related host error message.

SUMMARY OF THE INVENTION

The present invention eliminates the problems related to keyboard activated power switches and device: integrated power saving devices:

(a) The present invention monitors the computer port that is connected to a peripheral device. When the computer I/O port shows some activity, this invention supplies power to the peripheral and mediates the transition between the peripheral's power on state and ready state. When the computer I/O port shows no activity, the invention eliminates power to the peripheral.

(b) The present invention eliminates the requirement of modifying a computer or its peripherals to achieve energy savings. This invention is a separate unit that fits between the peripheral device's I/O port and the computer's I/O port. The power cord of the peripheral is plugged into the present invention's regulated power outlet; a regulated power outlet that is responsible for controlling power to the peripheral.

(c) The present invention is designed to use CMOS technology which minimizes energy usage by the present invention, permitting overall energy consumption to be greatly reduced.

(d) The present invention will work with any peripheral device that utilizes a parallel, serial, or other I/O port.

e) The Present invention uses a hold-off timer function that makes the present invention transparent to a host computer. The means of making the device transparent to the host is first addressed through the control signals, such as DTR, that are normally asserted by the printer when it is ready to accept data. By having the invention assert these same control signals as a peripheral the host believes that the printer is ready to accept data. Maintaining this continuous ready state then allows applications to initiate output without delay or user intervention despite the actual state of the printer. Thus when a peripheral is in a power-up state, the host computer believes that the peripheral is ready to send data.

Therefore, the present invention overcomes many limitations of existing computer energy savings devices for the above reasons.

DRAWING FIGURES

In the drawings, closely related figures have the same number but different alphabetic suffixes.

DESCRIPTION OF THE PREFERRED EMBODIMENT

Figure 1:
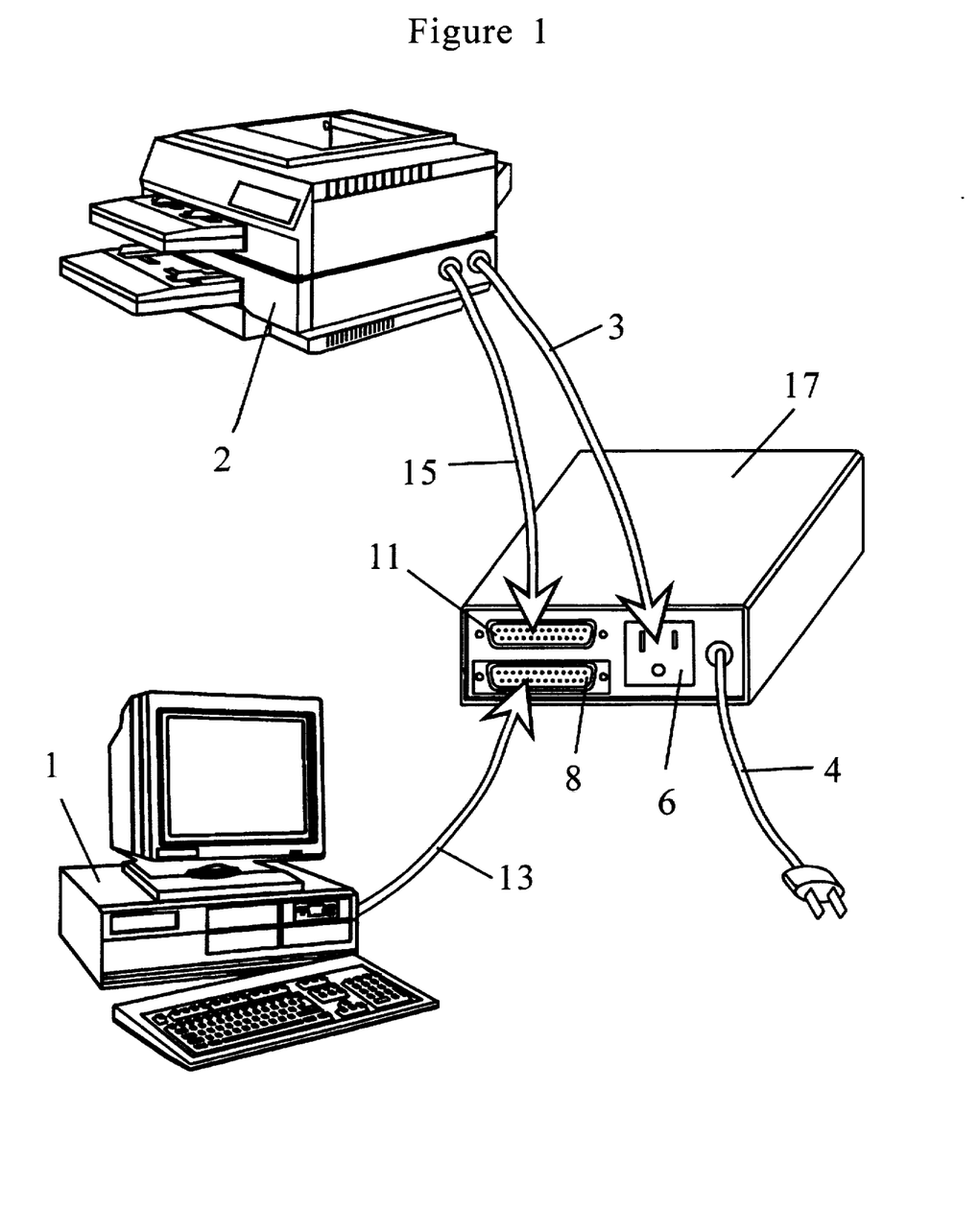
FIG. 1 device installed between a printer and computer.

FIG. 1 shows one embodiment of invention with peripheral power saver back 17 with a regulated electric outlet 6, and a host port 8 with a host data cable 13 extending from peripheral power saver back 17 to host 1. The host can be a computer or any other device that creates data that is sent to a peripheral 2 through an I/O port. A peripheral data cable 15 extends from the peripheral power saver port 11 to the peripheral 2. Power is supplied to Peripheral Power Saver through a power source cord 4. Power to the peripheral 2 is controlled by a regulated electric outlet 6. The peripheral's power cable 3 is plugged into the regulated electric outlet 6.

Figure 2A:
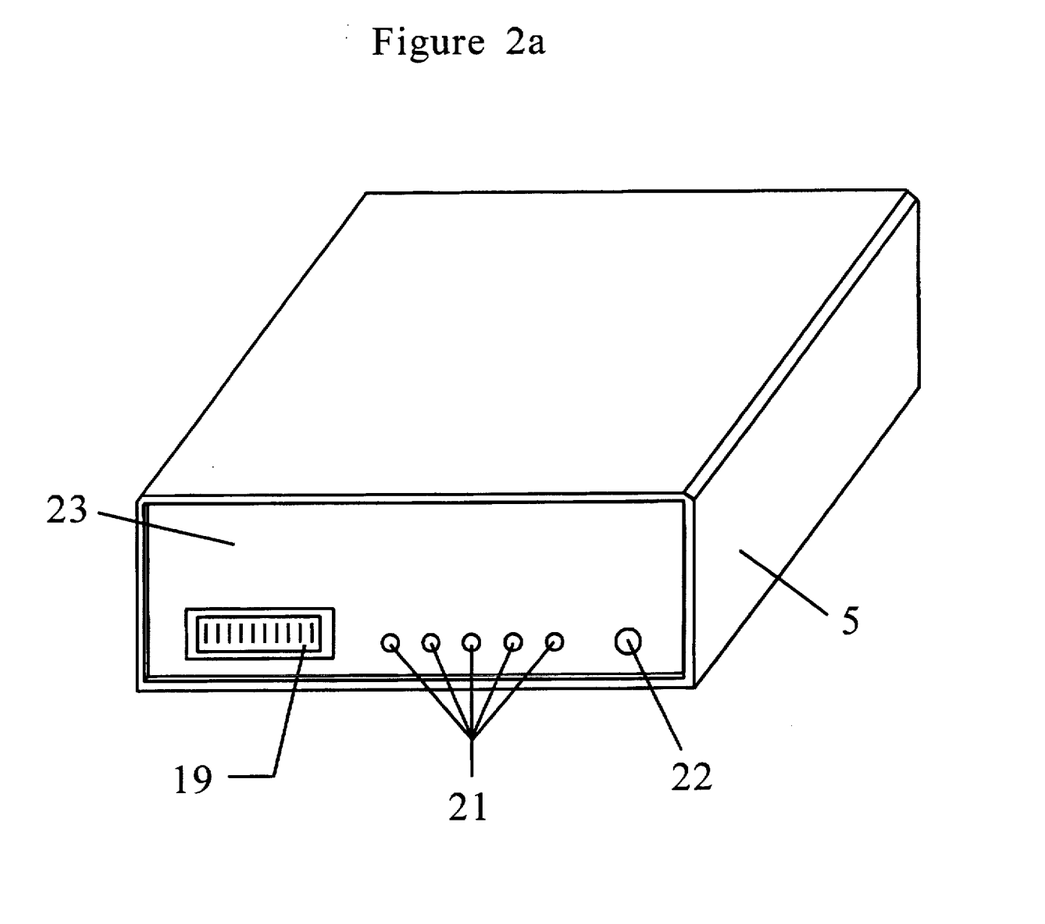
FIG. 2a Front view of the invention case.

FIG. 2a shows the Peripheral Power Saver case 5 having the preferred embodiment dimensions of 15.25 cm wide by 15.25 cm long by 5.1 cm deep. The case front 23 has a button 22 that is used either to initiate a report mode, or to accelerate the transition between the various state machines executing on a microprocessor. The case 5 also has several LEDs 21 that display information on the state of the present invention. The front 23 also has several dip switches 19 that are used to set various parameters for timers and I/O ports.

The dip switches, FIG. 2a 19, for the parallel version of the invention gives, a number of operational parameters to the microprocessor 49 (FIGS. 3a & 3b) including: 1) the period of time that the host's data port is inactive before the peripheral is turned off (in the present embodiment options include 10, 30, 60 and 120 minutes); 2) the presence or absence of usage statistics monitoring; 3) the "hold-off" time period (see FIG. 6b 185 & FIG. 9); and 4) the presence of beeper sound under certain conditions.

For the serial version of this invention the "hold-off" time period dip switch is absent. Instead information about baud rate, parity, and data byte size are reflected in the dip switches.

There are 5 LEDs 21 in the best mode embodiment of this invention including: a fault LED, a power on LED, a wait LED, a peripheral power saver power on LED, and an active LED.

Figure 2B:
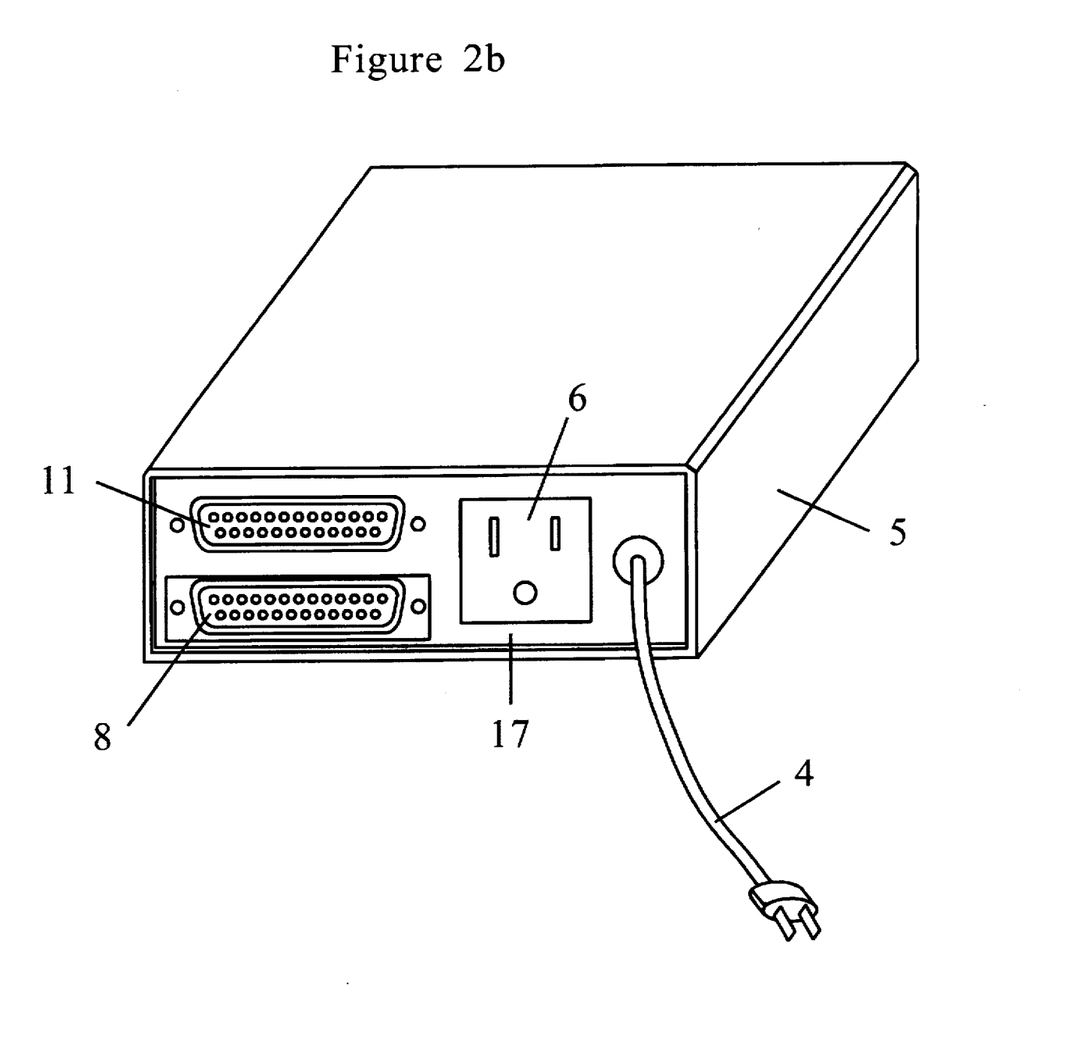
FIG. 2b Rear view of invention case.

FIG. 2b shows the Peripheral Power Saver case back 17 with a host port 8, a peripheral power saver port 11, a power source cord 4, and a regulated electric outlet 6.

Figure 3A:
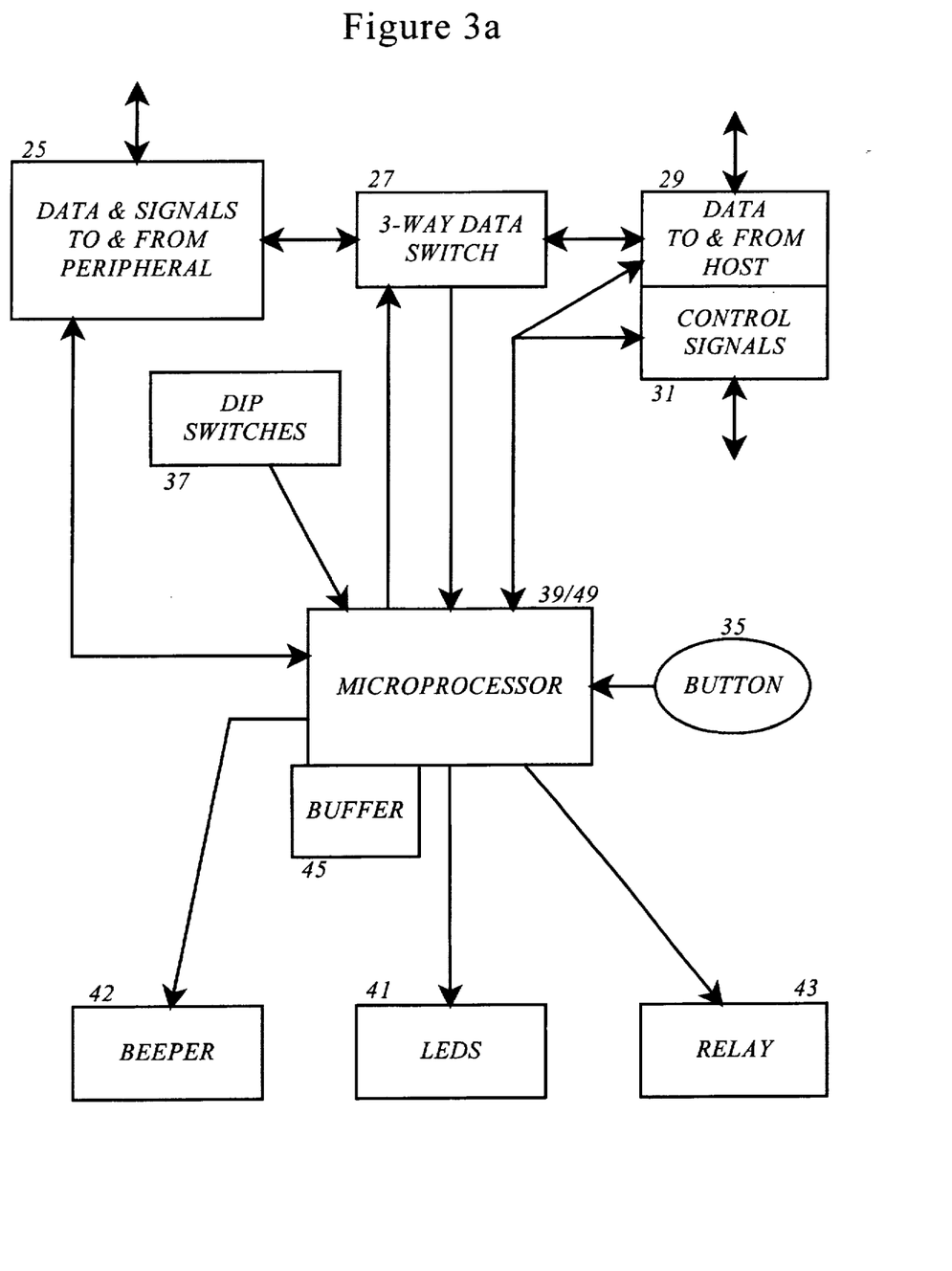
FIG. 3a Data flow for serial port embodiment of invention.

FIG. 3a depicts the data and signal flow for the serial port embodiment of the present invention. When the host (FIG. 1) 1 sends control data 31 to the peripheral 2 (FIG. 1), the data enters the present invention through the host port (FIG. 1) 8. The present invention then separates and converts the host's serial data stream into a non serial data stream 29 and a non serial control signal stream 31. The data stream 29 is then directed to the microprocessor 39 by a three-way switch 27 when the "Initializing State" machine, the hold-off function, or the "Power-Saving" state machine are active. When the Passing-Data State machine is active, the host's non serial data stream 29 is directed by the three-way switch 27 directly to the peripheral data and control signal stream 25 where it is converted to a serial stream for transfer to the peripheral 2 (FIG. 1) through the peripheral power saver port 11 (FIG. 1). The three-way switch 27 in the best embodiment of this invention is a PAL chip.

Other components of the serial version of the present invention include several devices for controlling time limits or defining the characteristics of the I/O port such as the button 35 and the dip switches 37, and several devices that show the state of the present invention such as a beeper 42, and LEDs 41, and a relay 43 that regulates the power to the regulated electric outlet 6 (FIG. 2b).

Figure 3B:
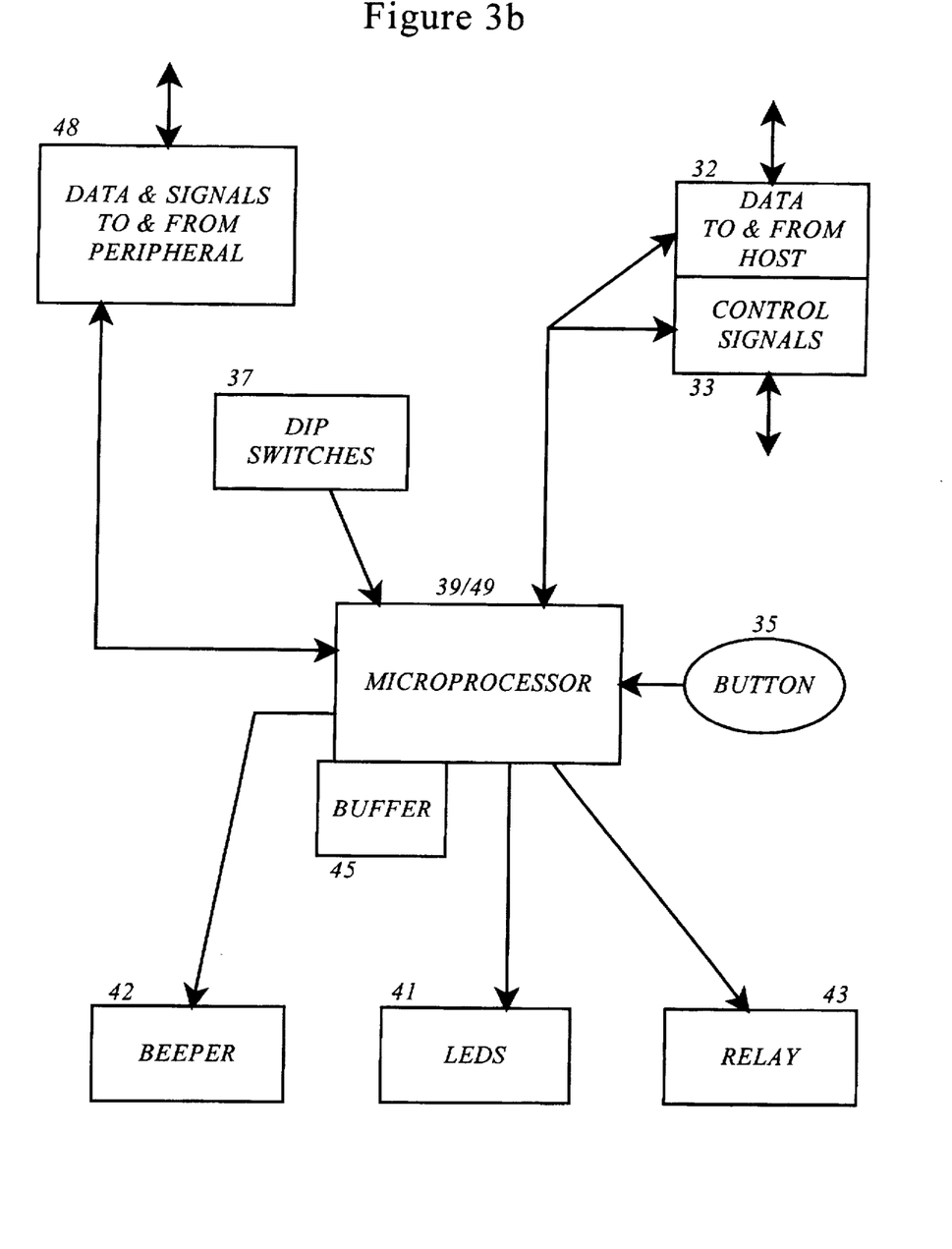
FIG. 3b Data flow for parallel port embodiment of invention.

FIG. 3b depicts the data flow for a parallel I/O port embodiment of the present invention. The major differences between the parallel I/O port embodiment of the present invention and the serial I/O port embodiment are the absence of a three-way switch 27 in the parallel I/O port embodiment, the lack of a requirement to convert a serial data to a non serial data stream, and the different method of controlling data flow using a parallel I/O protocol. Since there is no requirement to convert serial data to non serial data, most of the interfacing with the host port and the peripheral port is handled by buffer/tristate line drivers (see FIG. 3b32, 33, 48) and the microprocessor 39.

Figure 4A:
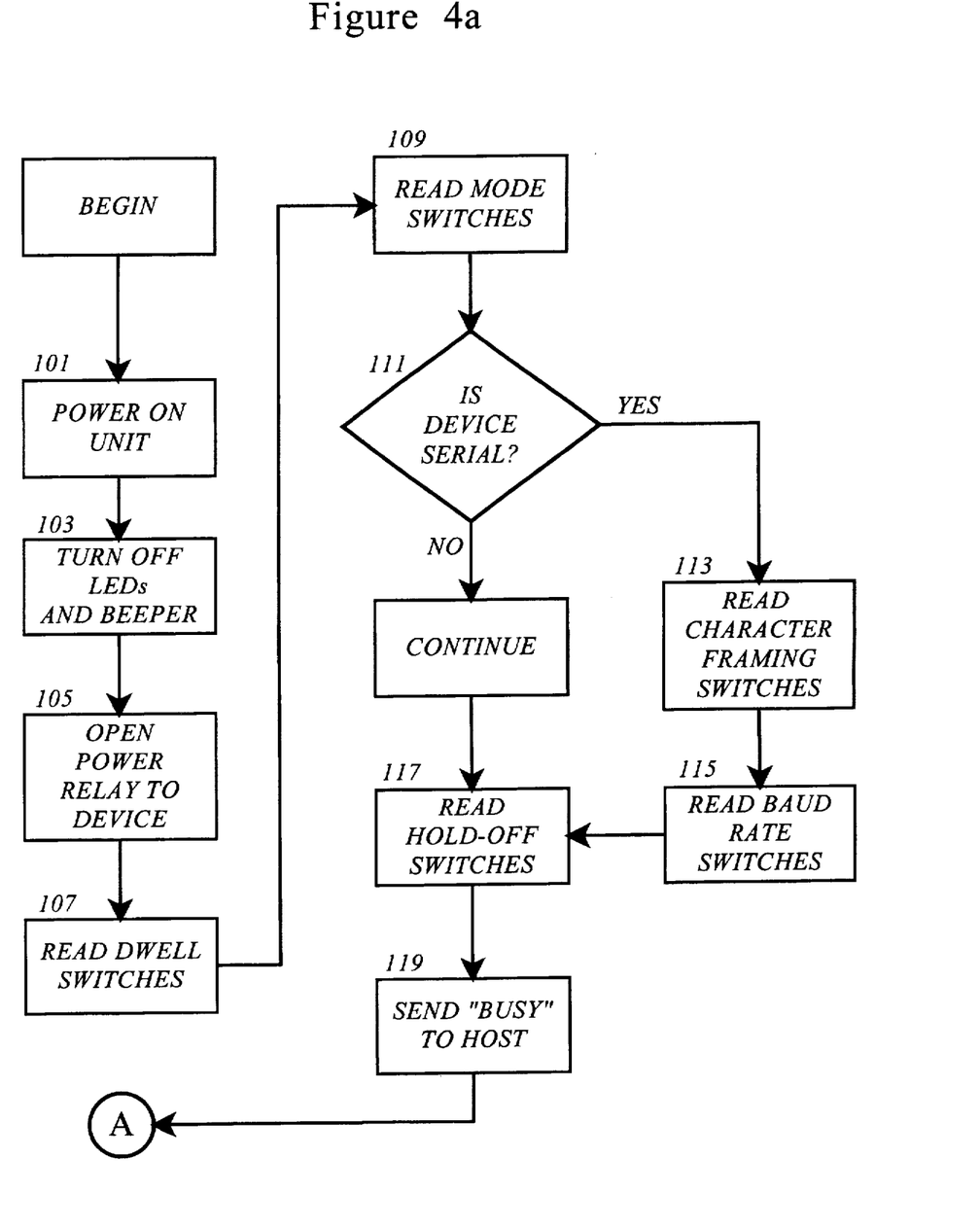
FIGS. 4a and 4b Flow chart depicting the process for "initialization state" of invention.
Figure 4B:
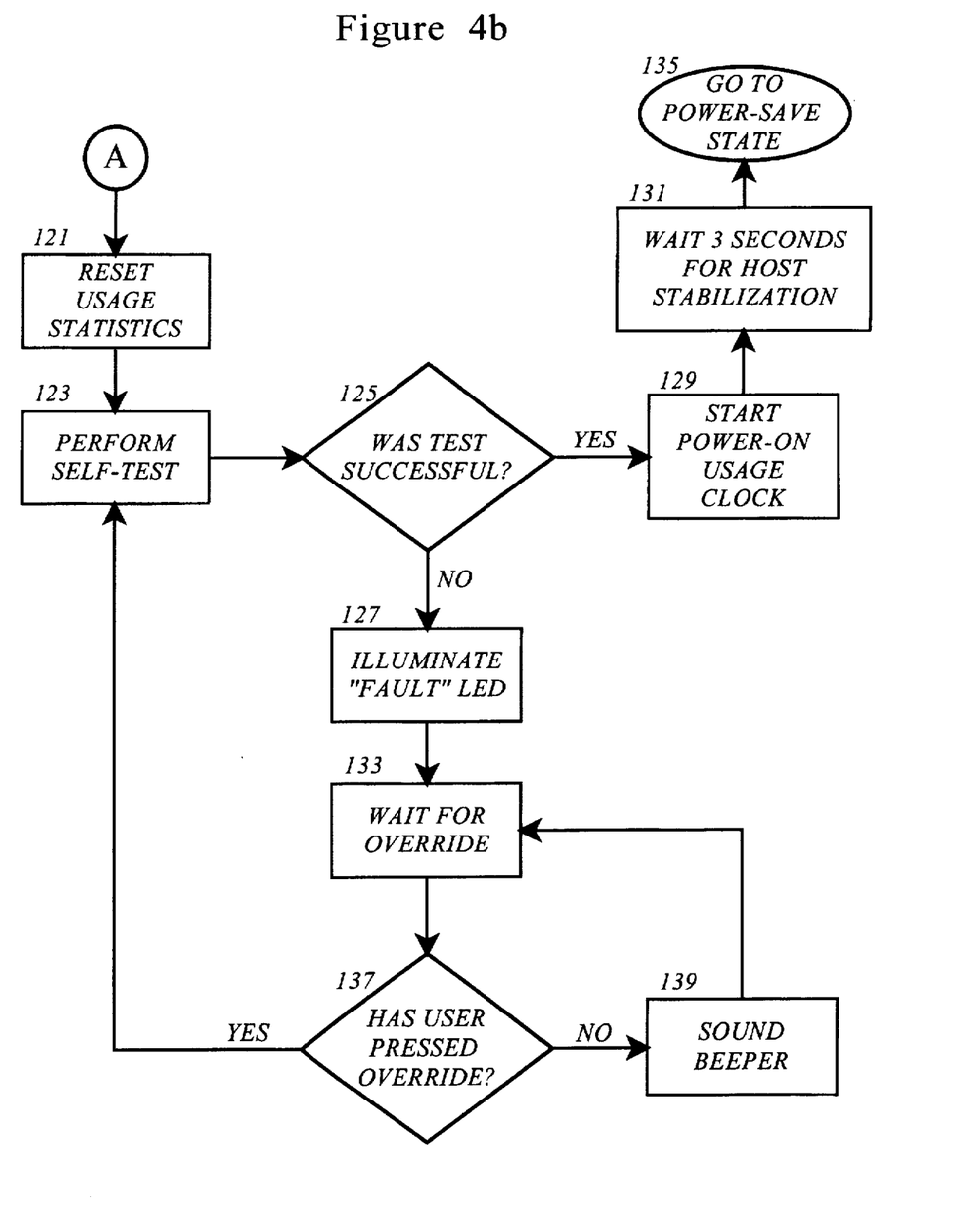

FIGS. 4a and 4b show the operation of the Initialization State Machine represented in flow diagrams 4a and 4b is activated when the invention is turned on.

The Initialization State machine performs a few preliminary tasks when the invention is activated including:

1) Turning off LEDs 103 (for location of LEDs see FIG. 2a 21).

2) Opening power relay 105 to turn off power to the regulated power outlet 6 (FIG. 3a & FIG. 3b 43).

3) Reading dip switches (FIG. 3a, FIG. 3b 37, FIG. 2a 19) 107, 109, 113, 117, and 115.

4) Sending busy signal to host (1) 119.

5) Performing invention (unit) confidence test 123 and processing the resulting fault if the unit fails the confidence test (see FIG. 4b 125, 127, 133, 137, and 139).

6) Initiating the collection of power usage statistics (see FIG. 4b 123, and 129).

7) Pausing the system for three seconds to permit the host (1) to stabilize 131.

8) Transferring control of invention to "Power-Save State" Machine.

Figure 5A:
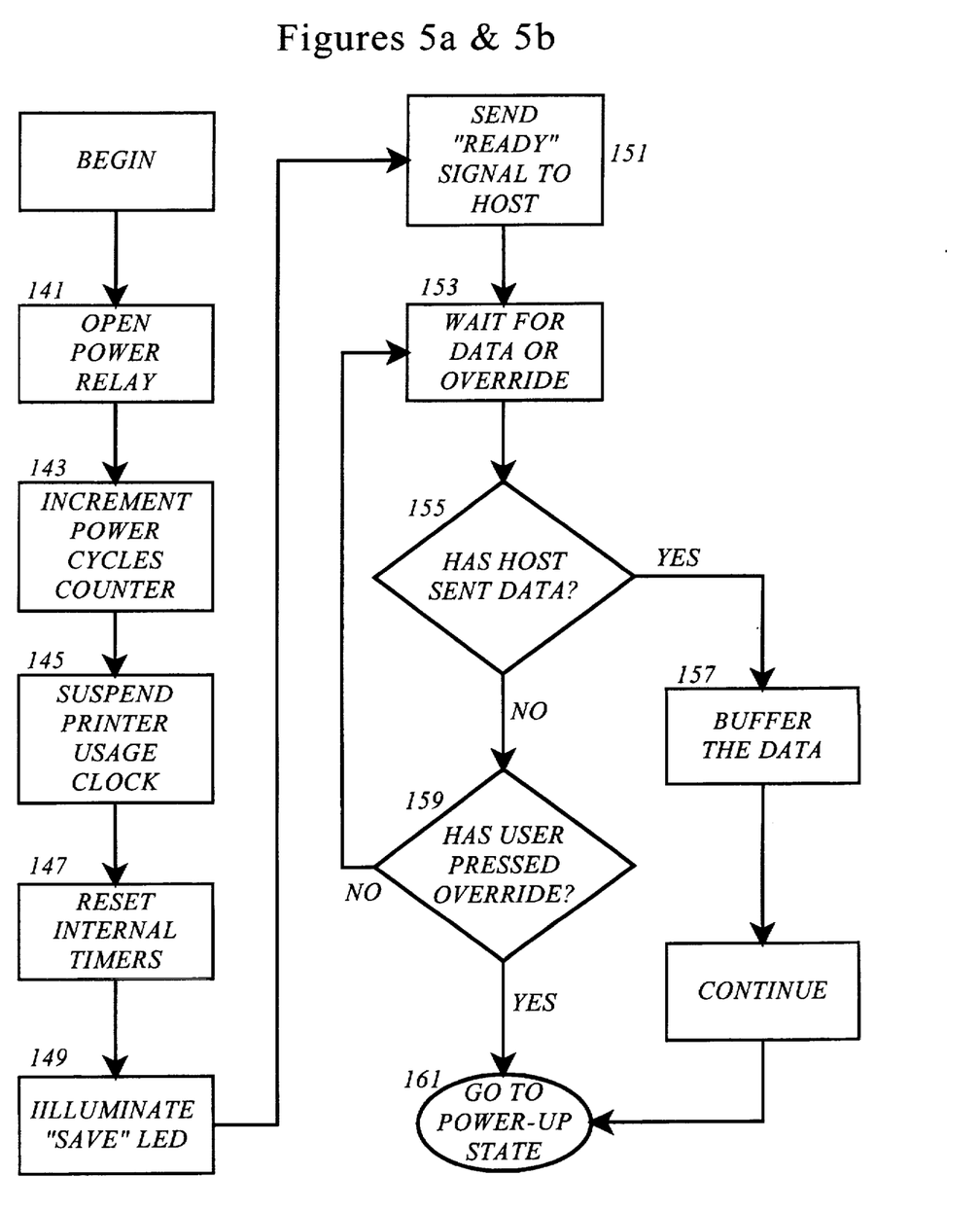
FIG. 5 Flow chart depicting the process for "power saving state" where invention has turned off power to peripheral and is monitoring host for signals indicating that the peripheral is required.

The Power-Save State Machine, which is represented by FIG. 5 performs three major functions including:

1) Opening the relay 43 (FIGS. 3a & 3b) 141 that turns off the regulated power outlet 6 (FIG. 2b).

2) Sending a ready signal to the host 151.

3) Monitoring host port for data 153 & 155. If host 1 transmits data, the data is buffered 157, and the "Power-Save State Machine" transfer control to "Power-Up State Machine."

Minor functions of the Power-Save State Machine include:

1) Accumulating data on power usage 143.

2) Suspending printer usage data collection 145.

3) Resetting timers 147.

4) Illuminating "save" LED 21 (FIG. 2a)

5) Monitoring button 22. If button 22 is pressed 159, the "Passing-Data State Machine" transfers control to "Power-Up State Machine" 161.

Figure 6A:
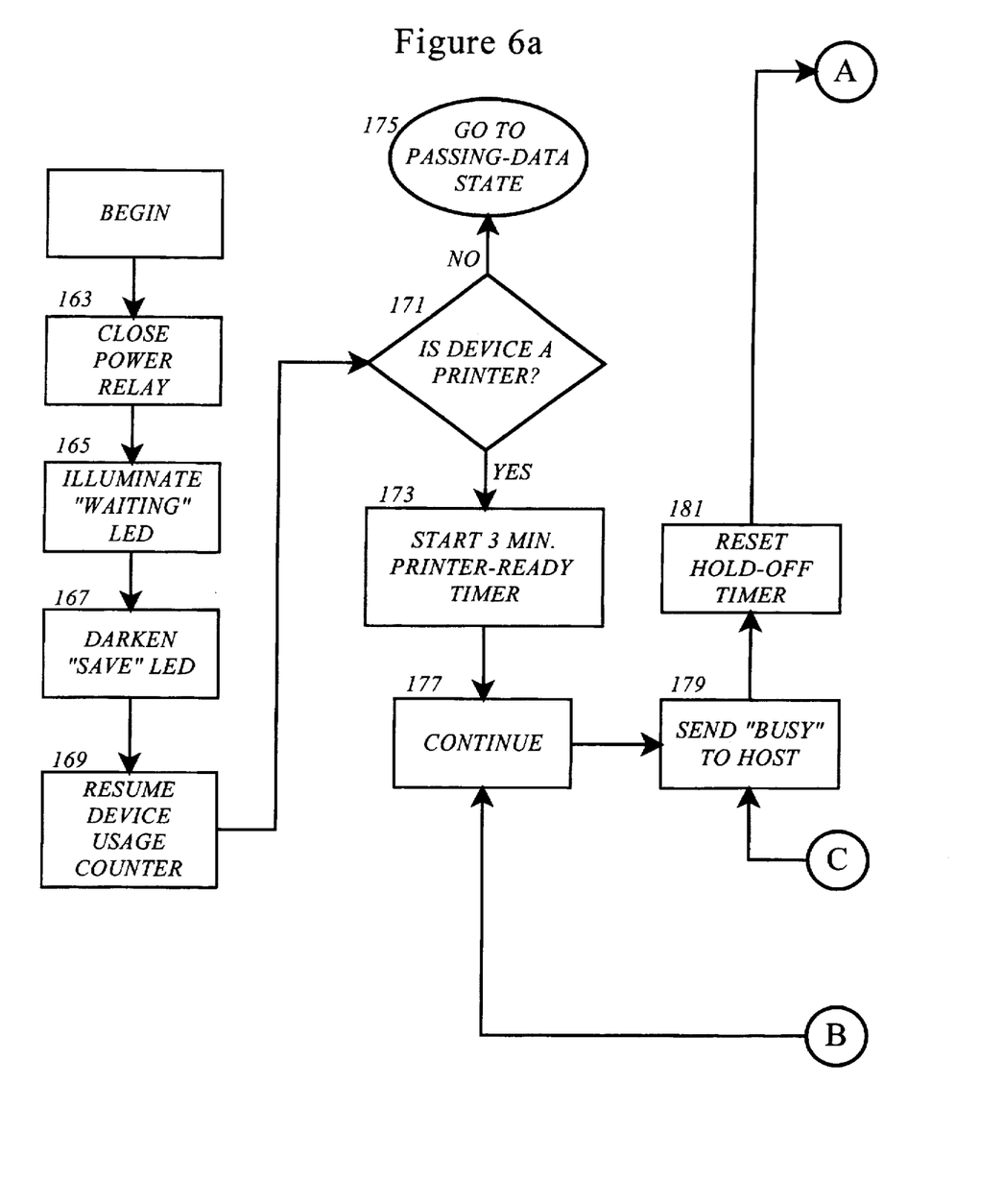
FIGS. 6a and 6b Flow chart depicting the process for "power up state" for turning on power to peripheral and mediating data flow until peripheral is ready to accept data.
Figure 6B:
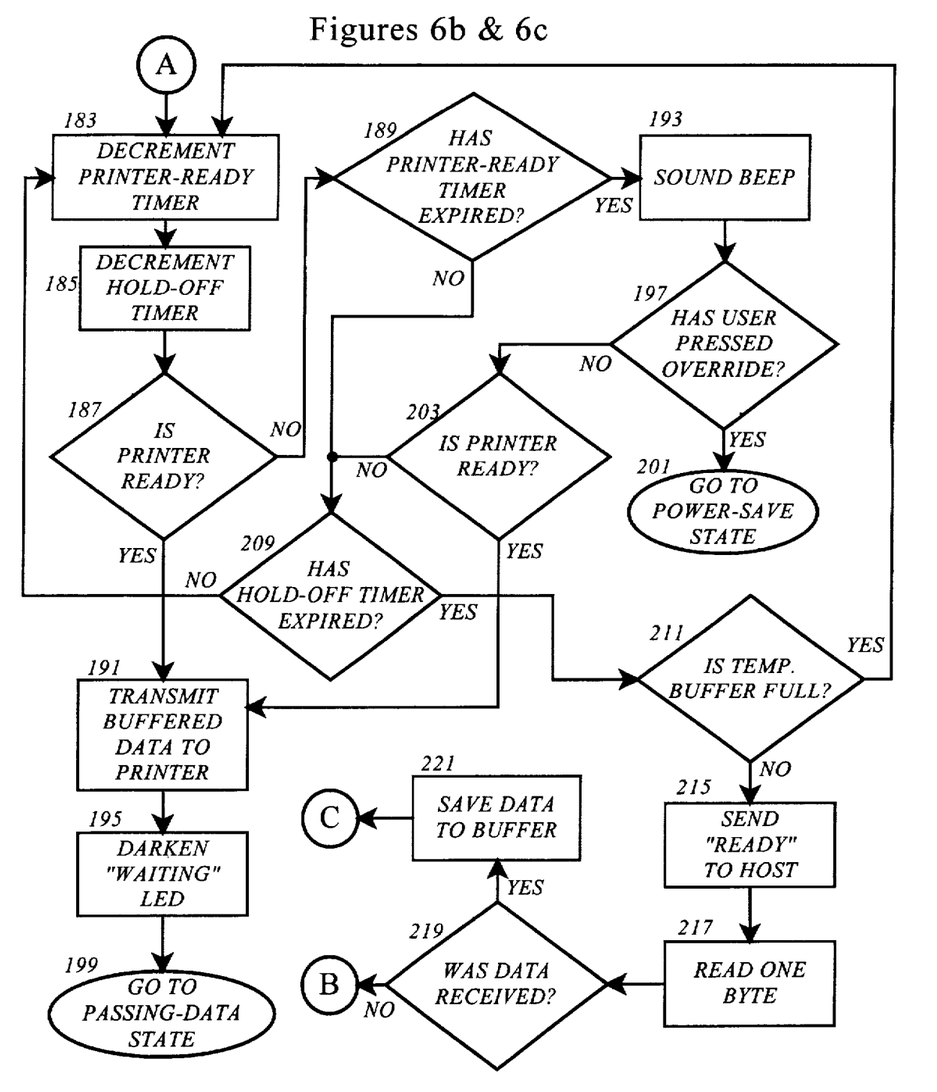

If the power-save state (FIG. 5) process is active, the "Power-Save State Machine" process transfers control of the invention to the "power-up state machine" process (see FIG. 6a and 6b) when the host port (FIG. 1) 8 shows activity. FIGS. 6a and 6b show the workings of the "power-up state machine." First, in FIG. 6a the process begins by closing power relay 163. This action is initiated by the microprocessor 39 sending a voltage to the relay 43. Closing the relay will activate the regulated electric outlet 6 and supply power to the peripheral (if the peripheral's power cord 3 is plugged into the regulated electric outlet 6). Then power is sent to the "waiting" LED 165 and power is removed from the "save" LED 167 (see also FIG. 2a 21 FIGS. 3a & 3b 41). The best mode embodiment of this invention accumulates data on power usage through a usage counter that is activated 169. The process then reads the dip switch 19 (FIG. 2a) on the front of the case 23 (see also FIGS. 3a & 3b 37). The positions of the dip switches indicate if the attached peripheral is a printer (or other device requiring a warm-up period) or a peripheral that requires no warm-up time. If the peripheral 2 requires no warm-up time, the "Powering -Up State Machine" transfers control of the invention to the "Passing-Data State Machine" (see FIGS. 7a and 7b). If the peripheral 2 requires a warm-up period, a 3 minute Printer-Ready timer 173 and a Hold-off timer 181 are activated. Also, a "busy" signal is send to the host 179. Then the "printer-ready" timer 183 and the Hold-off timer 185 are decremented. The microprocessor 19 then monitors the control signals from the peripheral (see FIG. 3a 25 and FIG. 3b 48 and 49). If printer is ready 187, the microprocessor 39 transfers buffered data from the buffer 45 (FIG. 3a & FIG. 3b) to the peripheral 191. If the peripheral is serial, then the three way data switch 27 controlled by the microprocessor 39 is used to selectively shunt data between the peripheral port 2, and the microprocessor 39, between the host port (see FIG. 3a 29, 31, & 33). and the microprocessor 39, and between the host port (see FIG. 3a 29, 31, & 33) and the peripheral port 25. After a peripheral ready status is established, and a data path is established between the host and the peripheral, the waiting LED FIG. 2a 21 and FIG. 6b 195 is turned off, and control is transferred to the "Passing-Data State Machine" 199.

Figure 9:
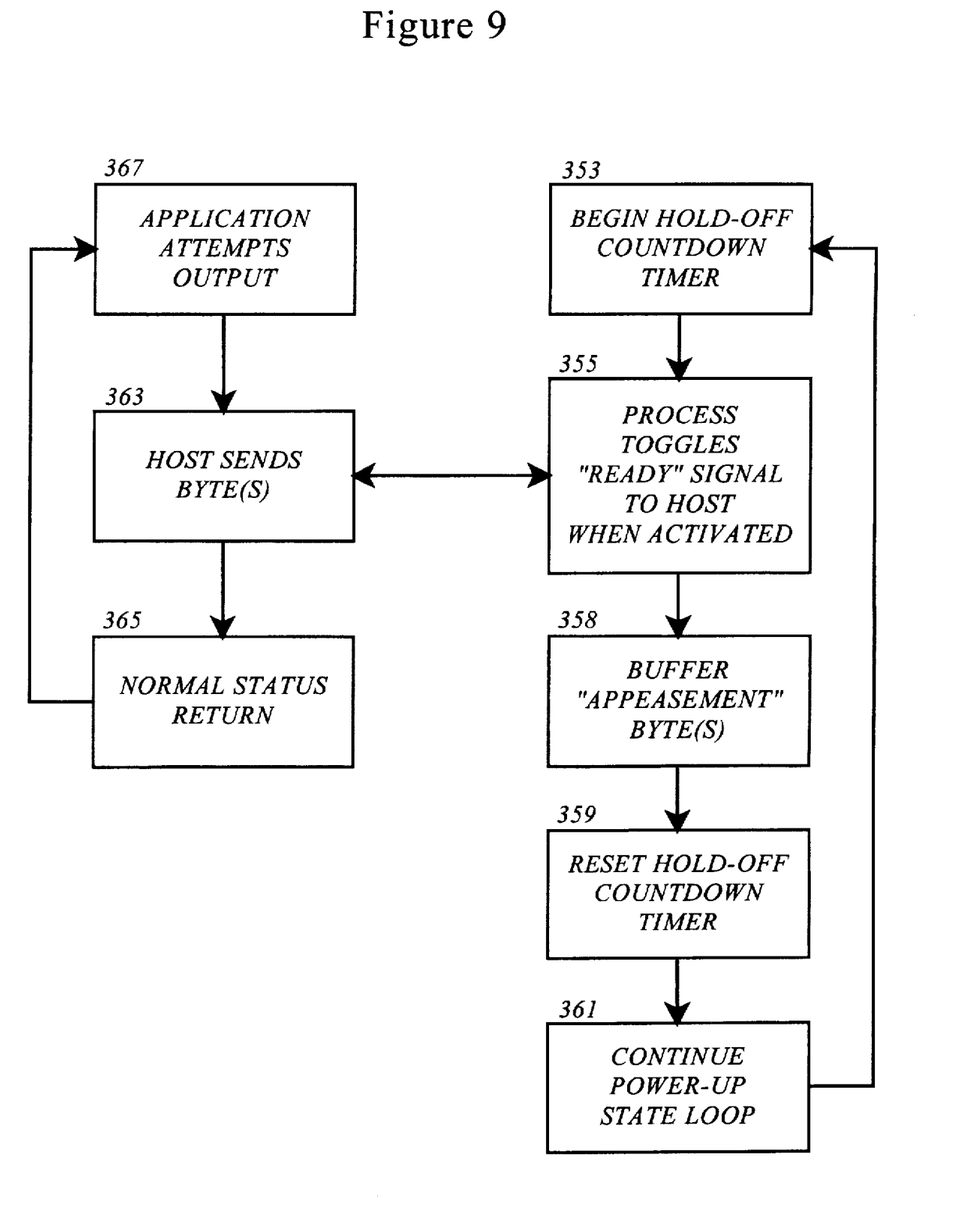
FIG. 9 Flow diagram depicting the hold-off process.

FIG. 9 depicts the operation of the Hold-Off process. When the peripheral is in a powering-up state and an application is attempting to send data to the peripheral 367, the Hold-Off process periodically, based on the value of the hold-off countdown timer 353, requests and internally buffers in buffer 45 a minimal amount of data (i.e., 1–2 bytes) 358 from the host 1, during the: power-up state of the attached peripheral, to fool the host application into thinking that output is progressing normally but very slowly 365. This periodic request is performed by momentarily toggling the applicable peripheral "ready" signal (s) 355, resetting the hold-off countdown timer 359, and then continuing the power-up state loop 361. The execution of the hold-off process is set to occur within the time-out error threshold of the application or operating system. In the parallel version of the invention, the hold-off countdown timer period is selectable through a dip switch. In the serial version, the hold-off countdown timer period will be hard-coded at 10–15 seconds (other time periods may also be acceptable). By repeating the hold-off process, for example, every 15 seconds, the limited internal data buffer of the invention would be sufficient to appease the application during the power-up phase of the peripheral for at least several minutes. When the attached peripheral is ready, output will resume at normal speeds.

If the peripheral 2 is not ready, the "Power-Up State Machine" process looks at the "Printer-Ready" timer. If the timer has expired 189, then the beeper (FIG. 3a and FIG. 3b) 42 is sounded 193. If the operator presses button 22 (FIG. 2a) 35 (FIG. 3a and 3b), control is transferred to "Power-Save State Machine." If button 22 is not pressed, the printer is not ready, the hold-off timer has expired 209 and the temporary buffer is not full 211, the process sends a ready signal to host 215. Sending a ready signal at this point tells the host 1 that the peripheral is ready. The process then reads one byte of data 217 from the host. If data was received 219, the data is placed in the buffer 221. If data was not received, the process returns to "continue" 177 and repeats its monitoring cycle until the peripheral 3 to reach a ready state. If the hold-off timer has not expired, the process returns to 183 and begins another cycle of polling the peripheral for a ready state.

Figure 7A:
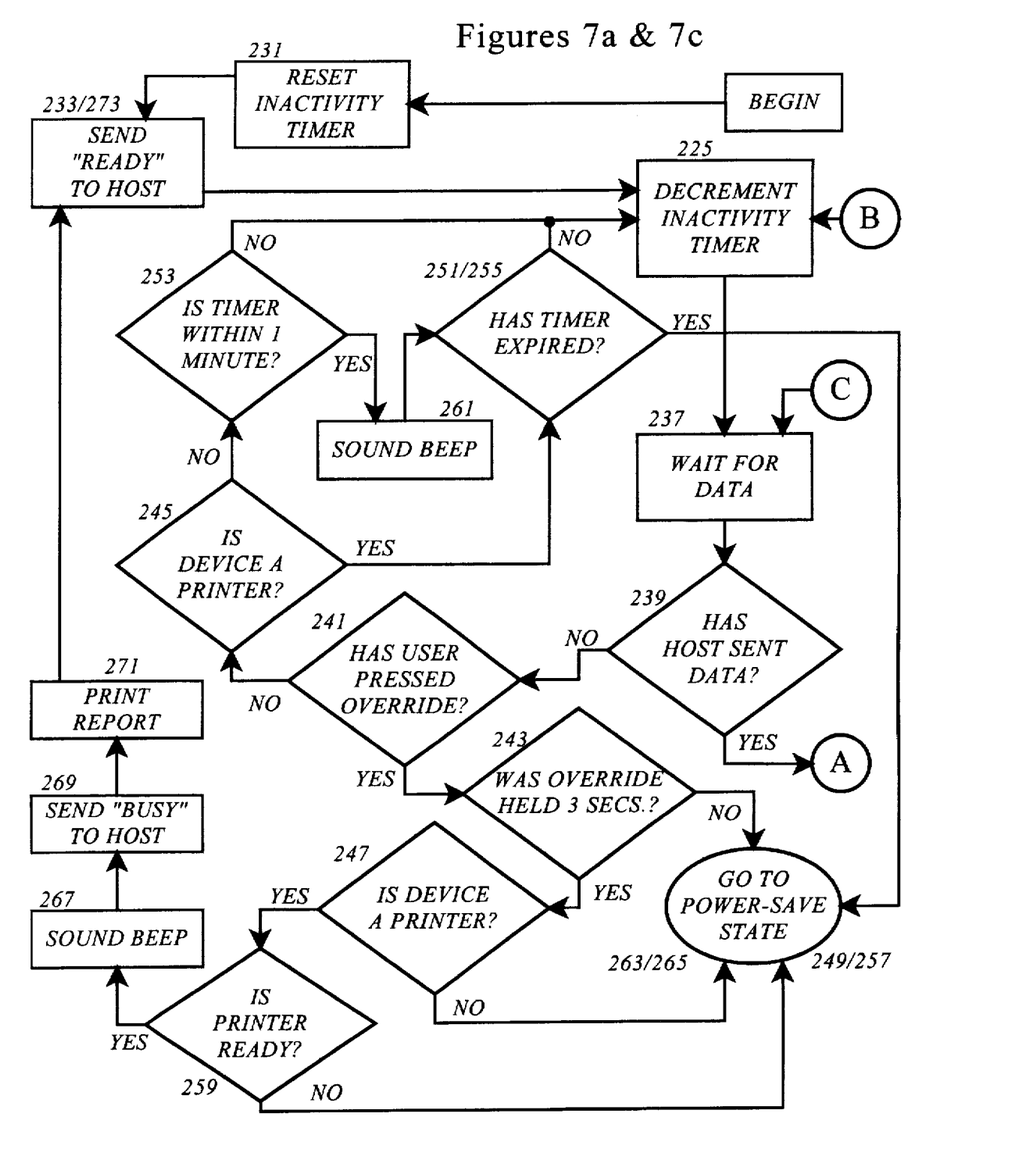
FIGS. 7a and 7b Flow chart of process for "passing data state" where data is passing between host and peripheral and invention is monitoring the host and peripheral device for inactivity.
Figure 7B:
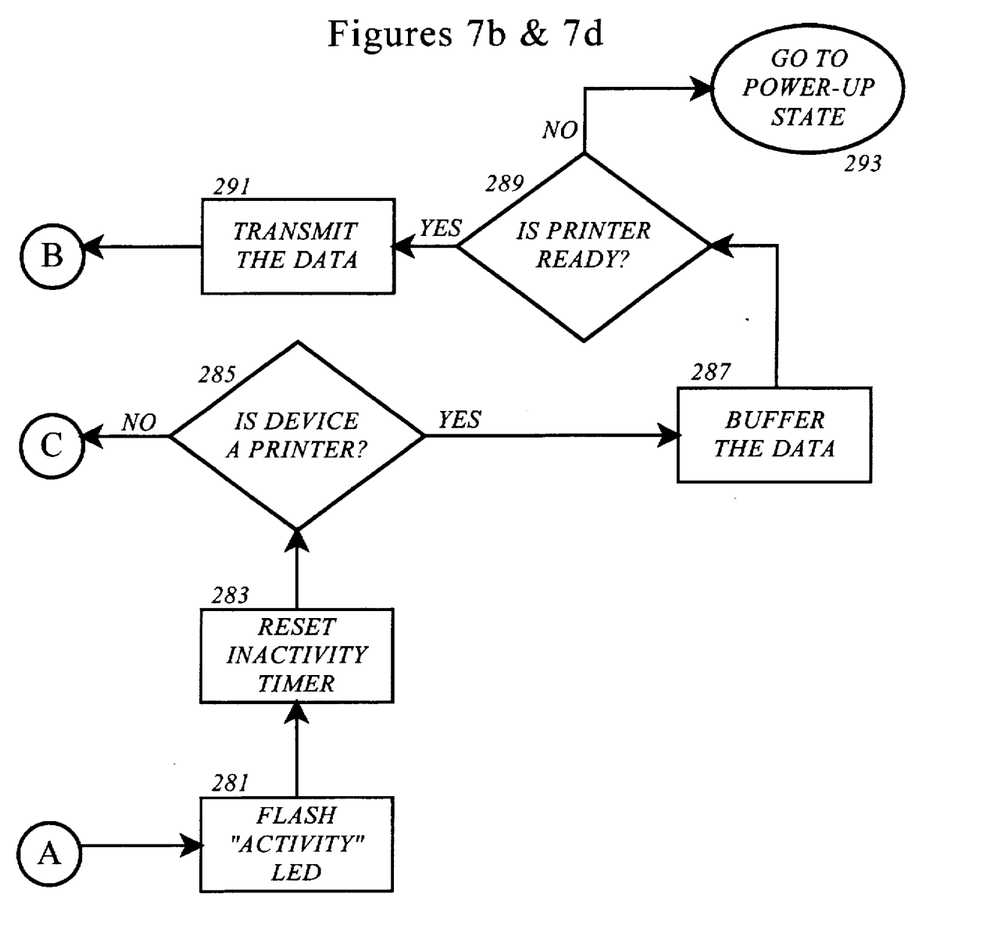

The Passing-Data State machine, FIGS. 7a and 7b has two major functions:

1. Sending a ready signal to host 231
2. Monitoring host 1 for activity 239

Other minor functions include:

1. Decrementing the inactivity timer 225 if host is no longer sending data.
2. Responding to the inactivity timer by sounding a beep for peripherals that require no warm-up time, and if the inactivity timer is within one minute from expiration (see FIGS. 7a and 7b 253 & 261) and if inactivity timer expires 255 or with peripherals without a warm-up requirement (see 245 & 249) transferring control to Power-Save State Machine.
3). Resetting the inactivity timer when Data Transfer state is initiated 231 and when the host is sending data to peripheral 283
4). Monitoring pressing of button 22 (FIG. 2a) and 35 (FIG. 3a, 3b). If button 22 is pressed for less than 3 seconds 243 control is immediately transferred to Power-Save State machine 249. If button 22 is pressed for more than 3 seconds and the peripheral is a printer, an activity report will be sent to the peripheral for printing (see 247, 259, 267, 269,271, and 273).
5). Transferring control to "powering-up state" if peripheral is not ready 289 & 293.

Figure 8:
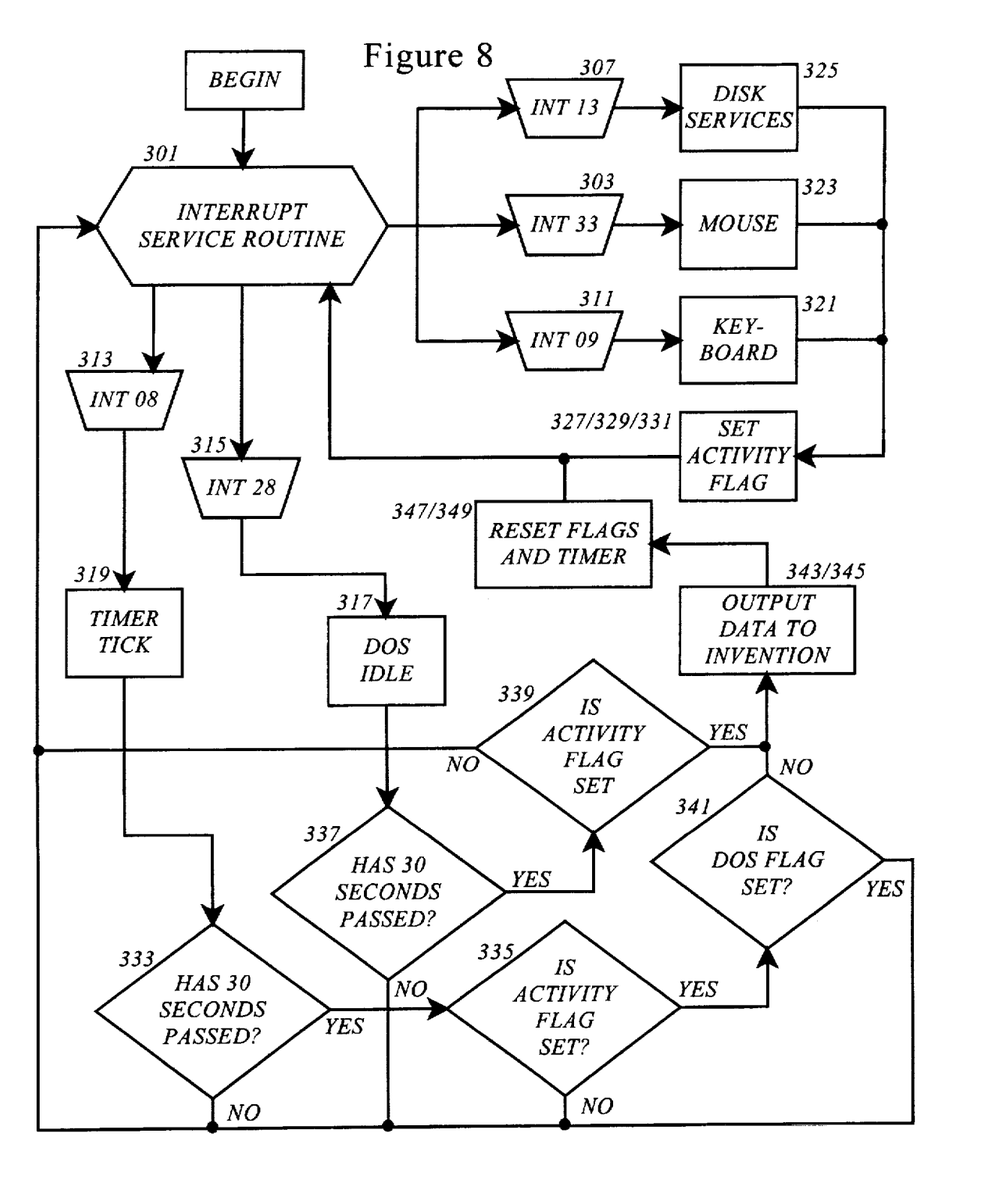
FIG. 8 Flow diagram depicting a process that monitors host activity. If there is activity, the process initiates power-up state of invention.

The present invention can also be controlled through a Terminate and Stay Resident process (TSR) that is diagrammed in FIG. 8. This TSR monitors three interrupts on a PC based system (see FIG. 8 307, 309, 311). A specific interrupt when active indicates if the disk services 325, the mouse 323, or the keyboard 321 are being used. If an interrupt is active, an activity flag is set (see 327, 329, and 331). At regular intervals, when either PC interrupt 8 or 28 are active 313 and 315 and 30 seconds have passed (333, 337), the activity flag is examined (335, 339). If the activity flag is set, data is sent to the data port with the present invention (345, 347). This action will initiate "Powering-Up State Machine" in the present invention. After data is sent to the port, the TSR will reset flags and timers (349, 347).

Accordingly, the peripheral power saver system is a system that will permit significant power savings without the need to retrofit a peripheral device with a power saving chip. The peripheral power saver unlike related art will negotiate the transition between a power off state and a peripheral ready state transparently, without loss of data.

Although the description above contains many specificities, these should not be construed as limiting the scope of the invention but as merely providing illustrations of some currently preferred embodiments of this invention. For example, it is not necessary for the invention to solely control the power consumption of printers. The power consumption of other peripheral devices can be reduced by the present invention. Also, the present invention will work with other types of data ports besides serial or parallel.

Thus the scope of the invention should be determined by the appended claims and their legal equivalents, rather than by the examples given.

I claim:

1. An apparatus for turning on and off a computer peripheral, comprising:

a. a means for monitoring the data from a computer data port;

b. a means for supplying power to a regulated power outlet when data is present at said computer data port;

c. a means for turning-off power to said regulated power outlet in the absence of data at said computer data port for a period of time: and d. a means for mediating the transition between a power off and peripheral ready state through the use of a hold-off timer function, comprising:
  a. requesting at most, the maximum number of bytes that can fit in one computer register from said computer data port at intervals to maintain a peripheral ready state in said host computer;
  b. buffering requested data;
  c. monitoring said computer peripheral for a ready signal; and
  d. sending data from the buffer when peripheral is ready to receive data.

2. A process for controlling the power usage of a computer peripheral through the activity at a data port, comprising:
  a. monitoring the host computer's data port for activity;
  b. supplying power to a computer peripheral when said computer data port is active;
  c. controlling data flow from host computer using a hold-off function comprising:
    a. requesting at most, the maximum number of bytes that can fit in one computer register from said computer data port at intervals to maintain a peripheral ready state in said host computer;
    b. buffering requested data;
    c. monitoring said computer peripheral for a ready signal; and
    d. sending data from the buffer when said computer peripheral is ready to receive data;
  d. monitoring the host computer data port for inactivity; and
  e. removing power to said computer peripheral if the computer data port has been inactive for a period of time.

* * * * *